United States Patent [19]

Broussaud et al.

[11] Patent Number: 4,576,923

[45] Date of Patent: Mar. 18, 1986

[54] METHOD OF MANUFACTURING PARTS OR POWDERS OF A NITRIDE COMPOUND OF SILICON OR OF A METAL BY REACTING SILICON OR METAL PARTS OR POWDERS IN THE SOLID STATE WITH A NITROGEN-CONTAINING REACTIVE GAS

[75] Inventors: Daniel Broussaud, Villebon sur Yvette; William Mustel, Palaiseau; Louis Minjolle, Tarbes, all of France

[73] Assignees: Armines; Ceraver, both of Paris, France

[21] Appl. No.: 598,912

[22] Filed: Apr. 10, 1984

[30] Foreign Application Priority Data

Apr. 13, 1983 [FR] France ................. 83 05993

[51] Int. Cl.$^4$ ................. C04B 35/58; F27D 19/00
[52] U.S. Cl. ................. 501/98; 423/344; 423/406; 501/96; 501/97
[58] Field of Search ................. 501/98, 97, 96; 423/344, 406

[56] References Cited

U.S. PATENT DOCUMENTS

| | | | |
|---|---|---|---|
| 3,937,792 | 2/1976 | Lumby | 423/344 |
| 4,184,884 | 1/1980 | Jong | 501/98 |
| 4,189,516 | 2/1980 | Dryburgh et al. | 428/698 |
| 4,235,857 | 11/1980 | Mangels et al. | 423/406 |
| 4,331,772 | 5/1982 | Torre et al. | 501/98 |
| 4,410,636 | 10/1983 | Minjolle et al. | 501/98 |

FOREIGN PATENT DOCUMENTS 0075841 4/1983 European Pat. Off. .

OTHER PUBLICATIONS

P. Wong et al., Procedure for Fabrication of Si$_3$N$_4$ by Rate-Controlled Reaction Sintering, Ceramic Bulletin vol. 57, No. 5, 1978, pp. 525-526.

*Primary Examiner*—Helen M. McCarthy
*Attorney, Agent, or Firm*—Kenyon & Kenyon

[57] ABSTRACT

In a method of manufacturing parts or powders made of a compound of silicon or of a metal by exothermally reacting parts or powders of silicon or a metal in the solid state with a gas, wherein the differential flow rate or the pressure variation of the reactive gas in contact with the part or the powder is sensed, and the reaction is performed at increasing temperatures as a function of the said differential flow rate or pressure of the reactive gas:

the improvement wherein a maximum differential flow rate or a maximum speed of pressure drop of the reactive gas is predetermined as a function of the chemical nature of the parts or powders, and optionally as a function of the density and the size of the parts, and the rise in temperature is suspended when the differential flow rate or the speed of pressure drop of the reactive gas reaches the predetermined maximum value, beyond which the reaction would run away and prevent complete transformation of the parts or the powders being obtained.

7 Claims, 2 Drawing Figures

METHOD OF MANUFACTURING PARTS OR POWDERS OF A NITRIDE COMPOUND OF SILICON OR OF A METAL BY REACTING SILICON OR METAL PARTS OR POWDERS IN THE SOLID STATE WITH A NITROGEN-CONTAINING REACTIVE GAS

The present invention relates to a method of manufacturing parts or powders from a compound of silicon or of a metal by exothermally reacting parts or powders of silicon or metal in the solid state with a gas, wherein the differential flow rate or pressure variation of the reactive gas in contact with the part or the powder is sensed, and the reaction is performed at temperatures that increase as a function of the differential flow or the pressure of the reactive gas. It is applicable, in particular, to the manufacture of silicon nitride or modified silicon nitride (SiAlON) parts or powders by reacting silicon-rich parts or powders in a nitrogen-rich gas.

BACKGROUND OF THE INVENTION

The reaction of silicon and nitrogen is highly exothermic, thus, when a nitrogen-rich atmosphere is caused to react on silicon under conditions of a controlled linear rise in temperature, the reaction runs away after a threshold temperature has been reached, thereby exceeding the melting point of silicon and producing a part having residual free silicon and large pores, with an apparent density which is much less than the density of silicon nitride obtained after completely nitriding a preformed part made of silicon. Analogous phenomena are observed whenever there is an exothermic reaction between a metal in the solid state in the form of a preformed part or a powder, and a gas such as nitrogen or oxygen.

Attempts have been made to mitigate this difficulty by performing the reaction at successive temperature stages, and monitoring each stage so that its temperature is not increased until reaction equilibrium appears to have been reached. Complete nitriding can be obtained by such a method at the cost of an excessive length of time.

Proposals have also been made to keep the pressure of the nitrogen in contact with the silicon to be nitrided at a predetermined level, and, once the reaction has started, to keep the temperature at a predetermined level until no further drop in nitrogen pressure is observed over some minimum duration, which indicates that the reaction has reached equilibrium. The temperature is then raised to a higher level and the operation is repeated in successive stages up to a temperature of about 1400° C., which is a little below the melting point of silicon. Although complete nitriding can thus be obtained, and the resulting parts have a specific density close to the theoretical maximum value, the nitriding operation remains lengthy.

Preferred implementations of the present invention thus provide a method of manufacturing parts or powders made of a compound of silicon or of a metal by exothermic reaction of the parts or the powder of silicon or of a metal in the solid state with nitrogen or with a nitrogen-rich gas, said method being rapid, but avoiding reaction runaway, and at least in the initial phases of the reaction avoiding any melting of the silicon or of the metal, which would otherwise lead to porosity in the part to be manufactured. The invention also seeks to provide a method which can be adapted to nitriding large parts as well as small parts.

SUMMARY OF THE INVENTION

The present invention provides a method of manufacturing parts or powders made of a compound of silicon or of a metal by exothermally reacting parts or powders of silicon or a metal in the solid state with a gas, wherein the differential flow rate or the pressure variation of the reactive gas in contact with the part or the powder is sensed, and the reaction is performed at increasing temperatures as a function of the said differential flow rate or pressure of the reactive gas, with the improvement wherein a maximum differential flow rate or a maximum speed of pressure drop of the reactive gas is predetermined as a function of the chemical nature of the parts or powders, and optionally as a function of the density and the size of the parts, and the rise in temperature is suspended when the differential flow rate or the speed of pressure drop of the reactive gas reaches the predetermined maximum value, beyond which the reaction would run away and prevent complete transformation of the parts or the powders being obtained.

The invention is advantageously applied to nitriding silicon having about 6% by weight aluminum added thereto, which makes it possible to operate without having to keep the partial pressure of oxygen to a very low value, and to obtain a nitrided product which is oxidation resistant.

In this case, the initial temperature rise is preferably fixed to around 45° C. per hour in the range 1000° C. to 1200° C.

At the end of processing, when a reduction is observed in the differential flow rate or in the speed of pressure drop, causing the temperature to rise steeply, the maximum temperature reached is advantageously maintained for several hours in order to ensure complete transformation.

BRIEF DESCRIPTION OF THE DRAWING

An implementation of the invention is described by way of example with reference to the accompanying drawing, in which.

MORE DETAILED DESCRIPTION

Figure 1:
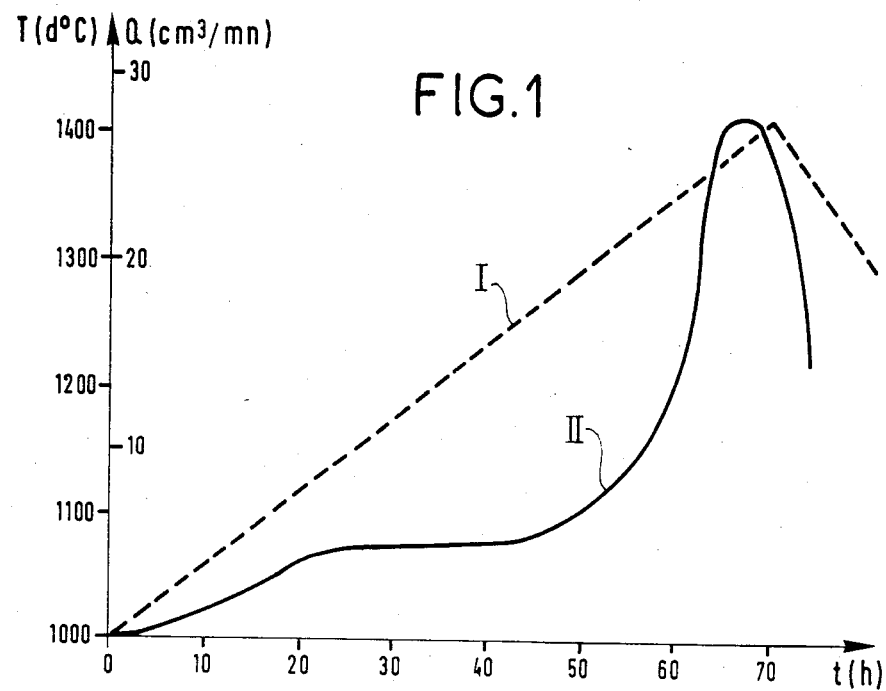
FIG. 1 is a graph provided for comparison purposes and showing the consumption of nitrogen as recorded during the nitriding of silicon parts with 6% aluminum under conditions of a slow linear rise in temperature in accordance with the prior art, the parts being 20×30×30 mm.

In FIG. 1, curve I shows temperature variation in a nitriding oven as a function of time, and curve II shows the corresponding variation in nitrogen consumption (measured as the difference between the nitrogen flow rate into the oven and the nitrogen flow rate out from the oven). The temperature is controlled to rise slowly and steadily as a function of time in accordance with one type of prior art method.

It can be seen that nitrogen consumption is initially low, and that it starts to rise significantly when the temperature reaches about 1200° C. Nitrogen consumption passes through a maximum at a temperature of about 1400° C. which is close to the melting point of silicon (1410° C.). As a result, silicon does actually melt in some regions of the parts, thus plugging pores and preventing nitrogen from penetrating to the bottoms of the pores. Micrographic examination then reveals that such parts include numerous regions which are rich in non-nitrided silicon which has sometimes melted, and which are about 100 microns in size. Further, the time necessary to complete the reaction is about 70 hours.

Figure 2:
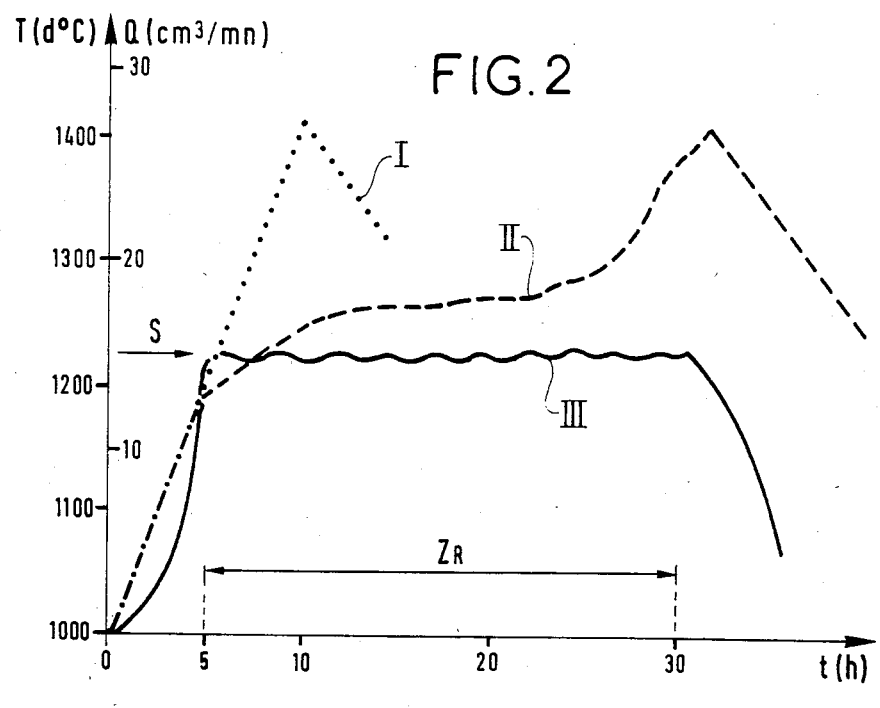
FIG. 2 is graph of nitrogen consumption as recorded during the nitriding of silicon parts similar to those used in preparing the FIG. 1 graph, but under temperature conditions which were controlled, in accordance with the invention, as a function of the differential flow rate so as not to exceed a maximum differential flow rate.

In FIG. 2, curve I shows the temperature variation that would take place if the same parts were nitrided without any upper limit on the rate at which nitrogen was consumed. Curve II shows a real temperature-time curve for parts of the same nature, but including regulation of the rate of nitrogen consumption to a predetermined threshold value S. Curve III shows the corresponding variation in nitrogen consumption.

As can be seen in FIG. 2, when the nitrogen consumption rate is regulated, the method begins with rapidly raising the temperature to about 1200° C. over a period of 4 to 5 hours. The nitriding reaction is triggered at this temperature. The rate at which nitrogen is consumed (measured as the difference between the flow rate into the oven and the flow rate out from the oven) is then regulated to 15 cm$^3$/min. The temperature continues to rise, but only slowly until near the end of the reaction when there is a steep rise to about 1400° C. The nitrogen consumption rate remains practically constant for the entire period $Z_R$ for which it is regulated, and then falls off rapidly at the end of the reaction. Micrographic examination of the parts shows only very few regions which are rich in non-nitrided silicon, and these regions are very small being only a few tens of microns in size at most. The total duration of the nitriding process is about 30 hours.

The nitrogen flow rate is monitored by means of flow meters at the inlet to the oven and at the outlet from the oven. The inlet flow rate is kept constant by a regulator having a set point. The flow rate meters are connected to a programmable regulator in which the maximum differential flow rate set point has been stored, and which operates on oven heater resistance elements so as to keep the differential flow rate equal to or less than the fixed maximum.

Although the method of manufacturing parts or powders made of silicon nitride or of modified silicon nitride as described above appears to be the best method of implementing the invention, it will be appreciated that various modifications can be made to the method without going beyond the scope of the invention. In particular, the regulation could be obtained by fixing a maximum speed of nitrogen pressure drop in the oven. Nitriding could be performed using a gas other than nitrogen, for example by using a mixture of nitrogen and hydrogen, or nitrogen and an inert gas such as argon or helium, or nitrogen and carbon monoxide or ammonia. The method may be applied to any exothermic solid-gas reaction in which it is desirable to monitor consumption of the reactive gas, eg. nitriding metal powders, eg. aluminum powder, of oxidizing metal powders, eg. nickel powder.

We claim:

1. A method of nitriding a material selected from the group consisting of silicon, metals, and mixtures thereof into a compound of said material by an exothermic reaction with a nitrogen-containing reactive gas, the method including initially heating the material in a reaction zone in the presence of said reactive gas so as to raise the temperature of the material to an exothermic reaction triggering temperature, delivering sufficient reactive gas to the reaction zone in contact with the material to completely transform by said exothermic reaction the material to said compound, and controlling the rate of said exothermic reaction so as not to exceed a preselected maximum reaction temperature above which complete transformation of the material would not occur, wherein the step of controlling the rate of said exothermic reaction comprises:

maintaining the consumption rate of the reactive gas substantially constant from the start of the exothermic reaction until the transformation has been completed at a level predetermined so as to allow the reaction temperature to increase up to, but not to exceed, said preselected maximum temperature.

2. A method according to claim 1 wherein said level of reactive gas consumption rate is predetermined as a function of the chemical nature of the material.

3. A method according to claim 2 wherein said level of reactive gas consumption is predetermined additionally as a function of the density and amount of the material to be transformed.

4. A method according to claim 1 wherein the step of maintaining the consumption rate of said reactive gas substantially constant at said predetermined level comprises delivering a substantially constant inlet flow rate of said reactive gas to the reaction zone, monitoring the inlet flow rate to the reaction zone and an outlet flow rate from the reaction zone, and controllably supplying heat to the reaction zone so as to maintain the difference between said inlet and outlet flow rates substantially at said predetermined level of reactive gas consumption.

5. A method according to claim 1 wherein the reactive gas is nitrogen.

6. A method according to claim 5 wherein the material to be transformed comprises silicon and about 6% by weight of aluminum.

7. A method according to claim 5 wherein the step of initially heating the material comprises supplying heat to the reaction zone at a rate such as to raise the temperature at a constant rate of about 45° C./hour.

* * * * *